(12) United States Patent
Sakaguchi et al.

(10) Patent No.: US 11,390,207 B2
(45) Date of Patent: Jul. 19, 2022

(54) HEADLIGHT CONTROL APPARATUS

(71) Applicant: TOYOTA JIDOSHA KABUSHIKI KAISHA, Toyota (JP)

(72) Inventors: Eiji Sakaguchi, Toyota (JP); Kazuhiko Nakashima, Miyoshi (JP); Shinsuke Moriyama, Seto (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/082,353

(22) Filed: Oct. 28, 2020

(65) Prior Publication Data
US 2021/0129737 A1 May 6, 2021

(30) Foreign Application Priority Data

Oct. 31, 2019 (JP) .............................. JP2019-199118
Oct. 1, 2020 (JP) .............................. JP2020-167043

(51) Int. Cl.
*B60Q 1/00* (2006.01)
*F21S 41/657* (2018.01)
(52) U.S. Cl.
CPC .......... *B60Q 1/0023* (2013.01); *F21S 41/657* (2018.01); *B60Q 2300/00* (2013.01)
(58) Field of Classification Search
None
See application file for complete search history.

(56) References Cited

U.S. PATENT DOCUMENTS

| | | | |
|---|---|---|---|
| 8,182,126 B2* | 5/2012 | Sugimoto | F21S 41/43 362/512 |
| 2002/0039294 A1* | 4/2002 | Okuchi | B60Q 1/1423 362/464 |
| 2017/0225609 A1* | 8/2017 | Tsuzuki | B60Q 1/115 |
| 2020/0198525 A1* | 6/2020 | Mueller | F21S 41/675 |
| 2021/0323466 A1* | 10/2021 | Chen | B60Q 1/085 |

FOREIGN PATENT DOCUMENTS

| | | |
|---|---|---|
| JP | 10-226271 A | 8/1998 |
| JP | 2003-307561 A | 10/2003 |

* cited by examiner

*Primary Examiner* — Ashok Patel
(74) *Attorney, Agent, or Firm* — Sughrue Mion, PLLC

(57) ABSTRACT

A headlight control apparatus for controlling an irradiation angle of a headlight of a vehicle based on a pitch angle includes a height sensor and a camera. The height sensor detects a displacement amount of a spring upper member with respect to a rotation axis of the vehicle as a contraction length. The apparatus obtains an infinity point correlation value based on an infinity point position in the image obtained by the camera in a vertical direction. When a predetermined condition is satisfied, the apparatus obtains a standard pitch angle based on the contraction length and obtains the infinity point correlation value at the present time as a standard infinity point correlation value. When the condition is not satisfied, the apparatus obtains the pitch angle based on the standard pitch angle, the standard infinity point correlation value, and the infinity point correlation value at the present time.

8 Claims, 11 Drawing Sheets

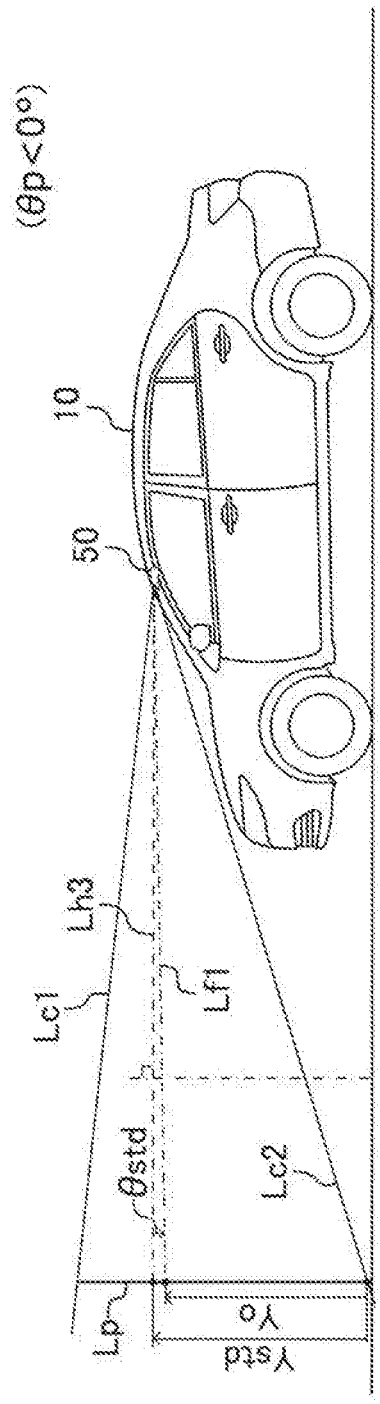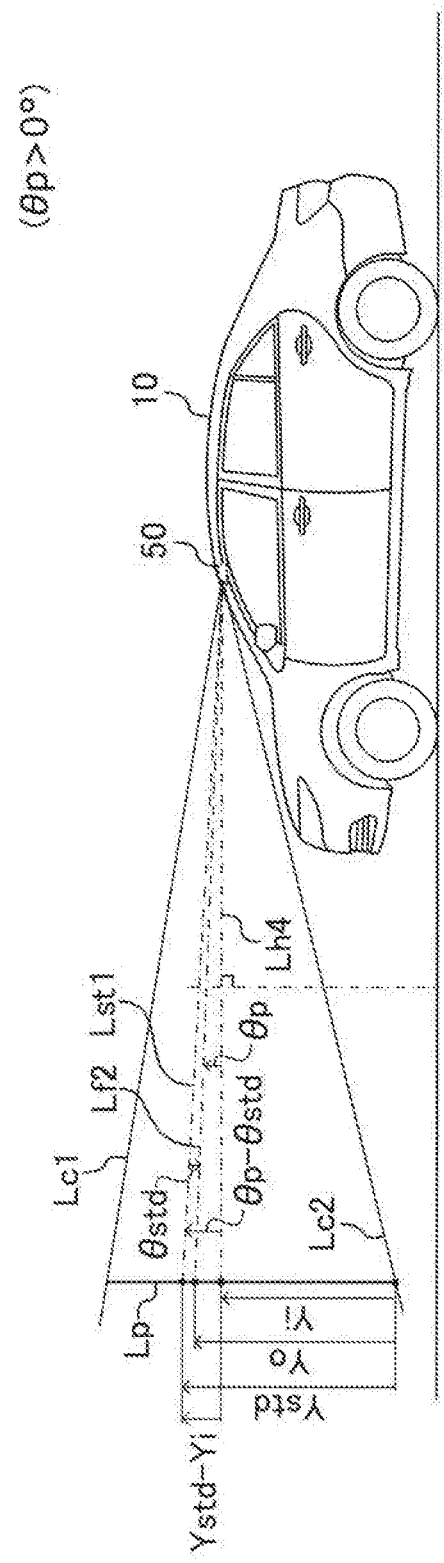
FIG. 6A
FIG. 6B

HEADLIGHT CONTROL APPARATUS

TECHNICAL FIELD

The present disclosure relates to a headlight control apparatus for automatically controlling an irradiation (emitting) direction of a headlight on the basis of a pitch angle of a vehicle.

BACKGROUND

A conventionally known headlight control apparatus (hereinafter also referred to as the "conventional apparatus") of this kind is equipped with a vehicle height sensor for detecting a change amount in a height of a rear. wheel axle (namely, a relative displacement amount of a spring upper member of the vehicle with respect to the rotation axis of the rear wheel). In addition, the conventional apparatus obtains (estimates) the pitch angle on the basis of the detected change amount in the height (see, for example, Japanese Patent Application Laid-Open (kokai) No. H10-226271).

According to the conventional apparatus, it is possible to obtain the pitch angle without disposing the vehicle height sensors for both a front wheel and the rear wheel.

SUMMARY

However, even if the change amount in the height is the same value (namely, the change amount in the height does not change), there may be a case where the pitch angle differs. For example, even if the change amount in the height is the same value, the vehicle leans backward more in a case where luggage is loaded at a position (for example, a rear trunk of the vehicle) behind the rear wheel axle as compared with a case where luggage is not loaded. In other words, even if the change amount in the height is the same value, the pitch angle may vary depending on a position of the center of gravity of a load (hereinafter also referred to as a "vehicle load") of the vehicle including a driver, an occupant (passenger) and luggage. Namely, the position of the center of gravity of the vehicle load may affect/influence the pitch angle estimated/extrapolated by the conventional apparatus, and thus, there may be a case where a difference between that estimated pitch angle and an actual value of the pitch angle is relatively large.

Incidentally, a vehicle equipped with a camera apparatus for obtaining a "travelling direction image" by capturing (photographing) an image of a region in a travelling direction of the vehicle is known. This kind of the vehicle, for example, provides a driving support function for automatically control a travelling speed and/or a steering angle (turning angle) of that vehicle according to a type and a position of an object contained in (furthermore, extracted from) the travelling direction image.

In view of the forgoing, one object of the present disclosure is to disclose a headlight control apparatus that can more accurately obtain (extrapolate) the pitch angle of a vehicle by utilizing a camera apparatus installed in the vehicle.

The headlight control apparatus for achieving the above-described object (hereinafter also referred to as "the apparatus of the present disclosure") comprises an actuator, a controller, a vehicle height sensor and a camera apparatus. The controller may be implemented by at least one programmed processor whose operation is determined by a predetermined program, gate arrays and the like.

The actuator adjusts (controls) an irradiation angle ($\theta b$) of a headlight (low beam unit 31) of a vehicle (10).

The controller (headlight control ECU 20, image processing section 52) obtains a target irradiation angle ($\theta btgt$) on the basis of a pitch angle ($\theta p$) of the vehicle; and controls the actuator such that the irradiation angle coincides with the target irradiation angle.

The vehicle height sensor (61) detects a relative displacement amount of a spring upper member of the vehicle with respect to a rotation axis of either a front wheel or a rear wheel of the vehicle as a contraction length (Ca).

The camera apparatus (50) obtains a "travelling direction image" by photographing a region in a travelling direction of the vehicle.

Furthermore, the controller executes an "infinity point obtainment processing" for obtaining an infinity point correlation value (infinity point position Yi, current pitch angle $\theta n$) having a correlation with an infinity point position (Yi) which is a position of an infinity point (for example, a point Pf in FIG. 4) contained in the travelling direction image in a vertical direction of the travelling direction image.

In addition, the controller determines whether a predetermined "standard value obtainment condition" is satisfied.

The controller execute a "standard value obtainment processing" for obtaining a standard pitch angle ($\theta std$) by applying the detected contraction length to a predetermined relationship (relationship represented by a straight line Le in FIG. 5) between the contraction length and the pitch angle and for obtaining the infinity point correlation value at the present time as a standard infinity point correlation value (standard infinity point position Ystd, reference pitch angle $\theta ref$), when it is determined that the standard value obtainment condition is satisfied (step 725 and step 730 in FIG. 7 and FIG. 10, and step 925 and step 730 in FIG. 9 and FIG. 11).

Meanwhile, the controller executes a "pitch angle estimation processing" for obtaining the pitch angle on the basis of the standard pitch angle, the standard infinity point correlation value, and the infinity point correlation value at the present time, when it is determined that the standard value obtainment condition is not satisfied (step 740 in FIG. 7 and FIG. 10, and step 942 in FIG. 9 and FIG. 11).

For example, if the infinity point position at a point in time when the pitch angle is 0° (namely, the vehicle is neither leaning forward nor backward) has been obtained as an image base point, it is possible to obtain the pitch angle at the present (current) time on the basis of the infinity point position at the present time and the image base point. The image base point can be obtained, for example, on the basis of an image captured by the camera apparatus, the image containing an image of a target object that is placed/positioned in front of the camera apparatus in a factory where the vehicle is manufactured, and on the basis of a positional relationship between the camera apparatus and the target object.

However, it may not be easy to accurately place/position the target object at a predetermined position in front of the camera apparatus (namely, in front of the vehicle) in many cases, and thus, there will be a higher possibility that an error of the obtained image base point is relatively large. Meanwhile, the infinity point position in the travelling direction image captured when the vehicle is travelling can be obtained by a well-known method with comparative accuracy. Namely, it is possible to relatively accurately obtain the infinity point correlation value on the basis of the travelling direction image. Therefore, the pitch angle can be accurately obtained on the basis of the travelling direction image even when the vehicle height sensors for both the front wheel and the rear wheel are not provided.

In one aspect (first aspect) of the apparatus of the present disclosure, the controller is configured to determine that the standard value obtainment condition is satisfied when the detected contraction length falls within a predetermined "standard range" (range from a first contraction length C1 to a second contraction length C2).

The standard range employed by the apparatus of the present disclosure is, for example, a range of the contraction length in which the pitch angle can be obtained/extrapolated with comparative accuracy based on the contraction length. In addition, the standard pitch angle and the standard infinity point correlation value are obtained when the contraction length falls within the standard range. Accordingly, it is possible to accurately obtain the pitch angle on the basis of the standard pitch angle and the standard infinity point correlation value, even when the contraction length is not included in the standard range.

Therefore, according to the first aspect, it is possible to accurately obtain the pitch angle (i.e., extrapolate the pitch angle used for determining the target irradiation angle) by utilizing the camera apparatus installed in the vehicle.

In the first aspect, the controller may be configured to employ, as the standard range, a range from a minimum value to a maximum value of the contraction length obtained while a load of the vehicle is a driver only (see FIG. 5).

If the vehicle load is the driver only, the position of the center of gravity of the vehicle load substantially remains unchanged irrespective of the driver's weight (namely, a body weight). Accordingly, if the vehicle load is the driver only, the contraction length detected by the vehicle height sensor is approximately the same value. Therefore, according to the present aspect, the standard pitch angle and the standard infinity point correlation value are obtained when a difference between the pitch angle estimated on the basis of the contraction length and the actual value of the pitch angle is relatively small, and thus, the pitch angle can be accurately obtained based on the relatively accurate standard pitch angle and the relatively accurate standard infinity point correlation value.

In still another aspect (second aspect) of the apparatus of the present disclosure, the controller is configured to determine that the standard value obtainment condition is satisfied when the detected contraction length is smaller than a "value obtained by subtracting a difference threshold (α) from a standard contraction length (Cstd)." In addition, the controller is configured to update the standard contraction length such that the standard contraction length is set to a value equal to the detected contraction length of when it is determined that the standard value obtainment condition is satisfied.

In a period from a time point when the vehicle starts travelling for the first time (a first travelling starting time point, namely, a time point when the vehicle starts a first travelling after the vehicle is manufactured) to a time point when the standard value obtainment condition is satisfied for the first time, the standard pitch angle and the standard infinity point correlation value cannot be obtained, and thus, the pitch angle cannot be obtained/extrapolated based on the standard pitch angle and the standard infinity point correlation value. Accordingly, it is preferable that the period from the first travelling starting time point to the time point when the standard value obtainment condition is satisfied for the first time be short.

According to the second aspect, the standard value obtainment condition is satisfied when the contraction length is smaller than a value obtained by subtracting the difference threshold from an initial value of the contraction length (namely, a value of the contraction length before a time point when standard value obtainment condition is satisfied for the first time which is set when the vehicle was manufactured). Therefore, according to the present aspect, it is possible to shorten the period from the first travelling starting time point to the time point when the standard value obtainment condition is satisfied for the first time.

In the second aspect, the controller may be configured to set the standard contraction length to a value (contraction length initial value Ci) larger than a value obtained by adding the difference threshold to an upper limit (maximum contraction length Cmax) of a range of the detected contraction length in a case where the standard pitch angle has not been obtained yet.

According to this aspect, it is certainly possible to shorten the period from the first travelling starting time point to the time point when the standard value obtainment condition is satisfied for the first time.

In still another aspect (third aspect) of the apparatus of the present disclosure, the controller is configured to obtain the pitch angle on the basis of a relationship that a first difference value is proportional to a second difference value (see an expression (13)), the first difference value being a difference between the tangent of the pitch angle at the present time and the tangent of the standard pitch angle (tan(θp)−tan(θstd)), and the second difference value being a difference between the standard infinity point correlation value and the infinity point correlation value at the present time (Ystd−Yi).

The infinity point correlation value is, for example, a position of a pixel (pixel position) in the vertical direction (namely, up and down direction) corresponding to the infinity point in "the travelling direction image which is a set of pixels." This pixel position changes as the pitch angle (more specifically, the tangent of the pitch angle) changes. Therefore, according to the third aspect, the pitch angle can be accurately obtained by a well-known calculation method using the trigonometric function.

In still another aspect (fourth aspect) of the apparatus of the present disclosure, the controller is configured to obtain the pitch angle on the basis of a relationship that a third difference value is proportional to a fourth difference value (see an expression (4)), the third difference value being a difference between the pitch angle at the present time and the standard pitch angle (θp−θstd), and the fourth difference value being a difference between the standard infinity point correlation value and the infinity point correlation value at the present time (Ystd−Yi).

The pitch angle varies as the weight and the position of the center of gravity of the vehicle load changes. However, generally, a magnitude of the pitch angle does not become excessive (the magnitude of the pitch angle is relatively small). Accordingly, an error (obtainment error) of the pitch angle is relatively small, even if that pitch angle is obtained based on the assumption that the third difference value is proportional to the fourth difference value. A proportionality constant in this case is, for example, a value obtained by dividing a field angle (θa) which is an angle of view of the camera apparatus in the vertical direction by a vertical pixel number (Yd) which is a number of pixels constituting the travelling direction image in the vertical direction. Therefore, according to the fourth aspect, it is possible to obtain the pitch angle with comparative accuracy by a simple process.

In still another aspect (fifth aspect) of the apparatus of the present disclosure, the controller is configured to obtain, as the infinity point correlation value (current pitch angle θn), a value proportional to a difference (Yo−Yi) between a specific infinity point position (image base point Yo) and the infinity point position at the present time, the specific infinity point position being the infinity point position obtained when the pitch angle was equal to a predetermined specific angle (0°). In addition, the controller is configured to obtain, as the pitch angle, a value obtained by adding the standard pitch angle to a difference (displacement pitch angle θfoe) between the infinity point correlation value and the standard infinity point correlation value (reference pitch angle θref) (see an expression (9)).

For example, the specific angle is 0°, which corresponds to a state where the vehicle is neither leaning forward nor backward. The specific infinity point position is, for example, obtained on the basis of the travelling direction image obtained (captured) while the vehicle stops (when the vehicle is not travelling). As described above, in many cases, it is not easy to accurately obtain the position of the infinity point in the travelling direction image which is obtained while the vehicle stops.

Meanwhile, in the fifth aspect, an error in the standard infinity point correlation value due to the inaccurate specific infinity point position and an error in the infinity point correlation value at the present time due to the inaccurate specific infinity point position are eliminated, because the errors are in common between the standard infinity point correlation value and the infinity point correlation value at the present time. Therefore, according to the fifth aspect, the pitch angle can be obtained accurately even if it is not easy to accurately obtain the specific infinity point position.

Notably, in the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

BRIEF DESCRIPTION OF THE DRAWINGS

FIG. 6A is a side view of the present vehicle when the pitch angle is a standard pitch angle;

FIG. 6B is a side view of the present vehicle when the pitch angle is an angle different from the standard pitch angle;

DETAILED DESCRIPTION

First Embodiment

Figure 1:
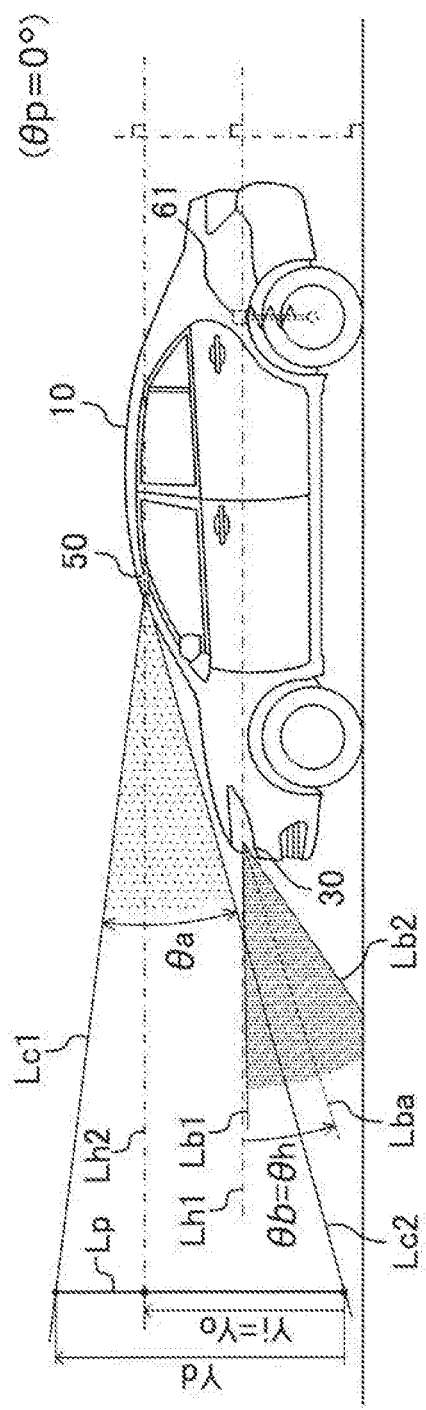
FIG. 1 is a schematic diagram of a vehicle (present vehicle) on which a headlight control apparatus according to a first embodiment of the present disclosure (first control apparatus) is mounted.

A headlight control apparatus according to a first embodiment of the present disclosure (hereinafter also referred to as the "first control apparatus") will now be described with reference to the drawings. The first control apparatus is applied to a vehicle 10 shown in FIG. 1. As understood from FIG. 2 illustrating a block diagram of the first control apparatus, the first control apparatus includes a headlight control ECU 20 which is an electronic control unit (ECU). Hereinafter, the headlight control ECU 20 is also referred to as the ECU 20 for simplification.

The ECU 20 includes a micro-computer which is equipped with a CPU 25, a ROM 26, a RAM 27 and a non-volatile memory 28 as major components. The CPU 25 performs data reading, numerical computation, computation result output, and so on, by repeatedly executing predetermined programs (routines). The ROM 26 stores the programs executed by the CPU 25, lookup tables (maps) read by the CPU 25 during execution of the programs, and so on. The RAM 27 temporarily stores data read by the CPU 25. The non-volatile memory 28 is formed by a rewritable flash memory and stores data (for example, a standard infinity point position Ystd and a standard pitch angle θstd described later) specific to the vehicle 10 itself.

The ECU 20 is connected to a headlight 30, a camera apparatus 50, a vehicle height sensor 61, and a dimmer switch 62.

The headlight 30 includes a low beam unit 31, and a high beam unit 32. The low beam unit 31 includes a left low beam unit 31a, and a right low beam unit 31b.

Figure 2:
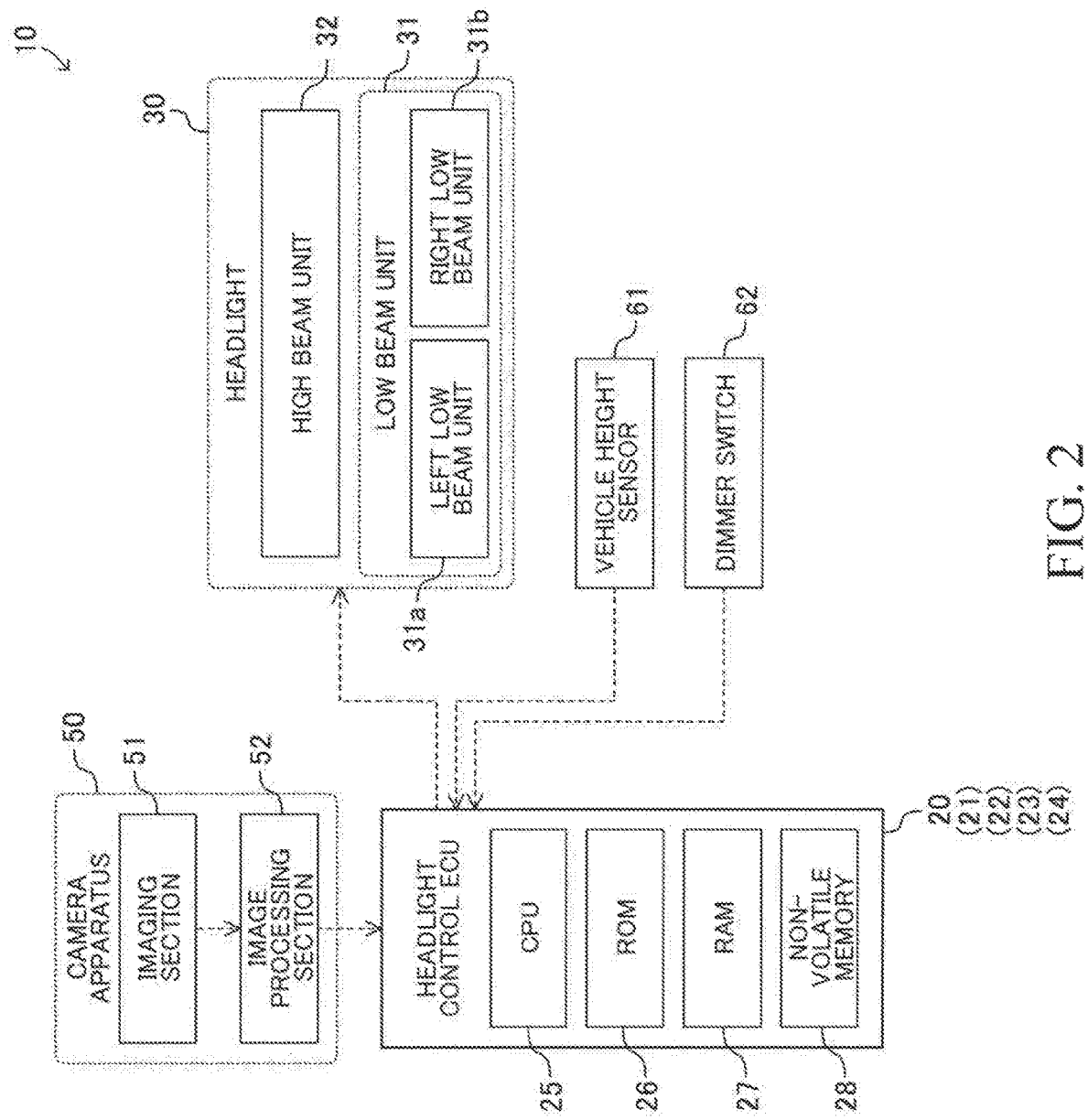
FIG. 2 is a block diagram of the first control apparatus.

An irradiation range in a vertical direction (up and down direction) of the low beam unit 31 (namely, the left low beam unit 31a and the right low beam unit 31b) is represented as a range between a straight line Lb1 and a straight line Lb2 shown in FIG. 1. A dashed line Lba in FIG. 1 is a bisector of the angle formed by the straight line Lb1 and the straight line Lb2.

An irradiation direction of the low beam unit 31 indicated by the dashed line Lba is changed (adjusted) according to a pitch angle θp of the vehicle 10 by an auto-leveling processing described later. More specifically, the pitch angle θp is an angle formed by a "ground-based horizontal line" and a "vehicular horizontal line." The ground-based horizontal line is a straight line parallel to a plane including a grounding points of four wheels of the vehicle 10 and extending in a longitudinal direction (namely, front and rear direction) of the vehicle 10. The vehicular horizontal line is a straight line parallel to a vehicle body (specifically, spring upper member) of the vehicle 10 and extending in the longitudinal direction of the vehicle 10.

In FIG. 1, a horizontal line Lh1 is the ground-based horizontal line, and a horizontal line Lh2 is the vehicular horizontal line. Hereinafter, an angle formed by the vehicular horizontal line and the dashed line Lba is also referred to as an irradiation angle θb. The auto-leveling processing is a processing for controlling the irradiation angle θb such that an angle formed by the dashed line Lba (namely, the irradiation direction of the low beam unit 31) and the ground-based horizontal line coincides with a predetermined antiglare angle θh (an angle θh for preventing a driver of another vehicle from being dazzled).

The pitch angle θp is an angle representing a degree (extent) indicative of how much the vehicle 10 (specifically, spring upper member) is leaned (tilted) forward or backward. When the vehicle 10 is neither leaning forward nor backward, the pitch angle θp is "0." Accordingly, when the pitch angle θp is "0," the vehicular horizontal line is parallel to the ground-based horizontal line.

The pitch angle θp is a positive value (namely, θp>0) when the vehicle 10 is leaning backward. The pitch angle θp is a negative value (namely, θp<0) when the vehicle 10 is leaning forward. In FIG. 1, the horizontal line Lh1 and the horizontal line Lh2 are parallel to each other, and thus, the pitch angle θp is "0."

Figure 3:
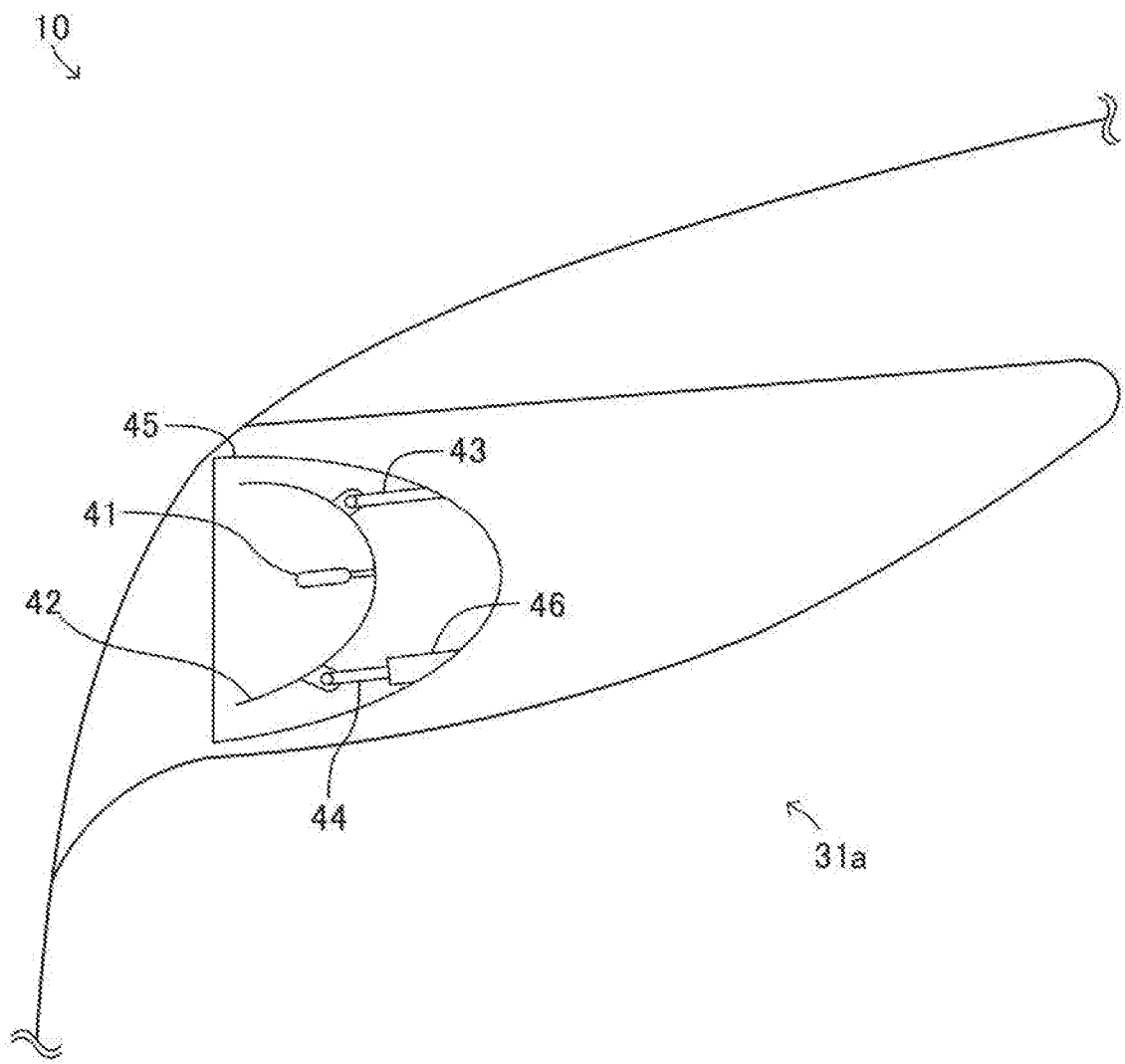
FIG. 3 is a diagram showing a structure of a low beam unit included in the present vehicle.

A structure of the left low beam unit 31a is shown in FIG. 3. Notably, a structure of the right low beam unit 31b is the same structure as the left low beam unit 31a, and thus, the right low beam unit 31b is not shown. The left low beam unit 31a includes a bulb 41, a reflector 42, an upper rod 43, a lower rod 44, a unit case 45, and an actuator 46. The bulb 41 is fixed to the reflector 42. The reflector 42 is supported by the unit case 45 via the upper rod 43 and the lower rod 44. An upper portion of the reflector 42 is rotatably supported by a front end portion of the upper rod 43, and a lower portion of the reflector 42 is rotatably supported by a front end portion of the lower rod 44. The unit case 45 is fixed to the vehicle body.

A length of the lower rod 44 is changed (adjusted) by operation of the actuator 46 (namely, the lower rod 44 advances and retreats axially in the longitudinal direction of the vehicle body), so that the reflector 42 swings (sways) in the vertical direction of the vehicle 10. Specifically, when the lower rod 44 extends (namely, its front end moves forward), the irradiation angle θb decreases, and thus, a region to be irradiated by the left low beam unit 31a moves upward. When the lower rod 44 contracts (namely, its front end moves backward), the irradiation angle θb increases, and thus, the region to be irradiated by the left low beam unit 31a moves downward. As described later, the ECU 20 controls the actuator 46, to thereby control the irradiation angle θb.

The camera apparatus 50 is disposed at a position on a cabin side of a front windshield of the vehicle 10 near an unillustrated inner rear-view mirror (a room mirror) fixed at a center upper portion of the front windshield. As shown in FIG. 2, the camera apparatus 50 includes an imaging section 51 and an image processing section 52. The imaging section 51 obtains (captures) an image of a region (scene) in front of the vehicle 10 as a "front image" every time a predetermined time interval Δt elapses, and outputs data (namely, static image data) representing the front image to the image processing section 52.

A captured range (angle of view) in the vertical direction (up and down direction) of the imaging section 51 is represented as a range between a straight line Lc1 a straight line Lc2 shown in FIG. 1. An angle formed by the straight line Lc1 and the straight line Lc2 is a field angle θa. A resolution of the front image in the vertical direction (namely, a number of pixels of which the front image consists in the vertical direction (up and down direction)) is a vertical pixel number Yd. The front image is also referred to as a "travelling direction image" for convenience' sake.

The image processing section 52 obtains/acquires a lot of optical flow vectors (hereinafter, also referred to as "flow vectors" for simplification) on the basis of a "latest image" (which is the front image last obtained by the imaging section 51) and a "previous image" (which is the front image obtained the time interval Δt before the latest image was obtained).

More specifically, the image processing section 52 divides the previous image into rectangles of a predetermined size (namely, treats the previous image as a set of the rectangles), and looks up (searches for) each of the corresponding/respective rectangles in the latest image. When the image processing section 52 finds out the rectangle in the latest image which is same as (or similar to) the rectangle in the previous image, the flow vector whose start point is a position of the rectangle in the previous image and whose end point is a position of the rectangle in the latest image is obtained. Namely, the image processing section 52 obtains the flow vectors by a so-called block matching method.

When the flow vectors are obtained, the image processing section 52 obtains an infinity point position Yi indicating an infinity point (FOE) in the front image in the vertical direction (see FIG. 1). The infinity point is a point in the front image representing a straight travelling direction of the vehicle 10 travelling on a flat road. The infinity point position Yi indicates a position of the pixel corresponding to the infinity point. When the infinity point is positioned at the lower end of the front image, the infinity point position Yi is "1." When the infinity point is positioned at the upper end of the front image, the infinity point position Yi is equal to the vertical pixel number Yd.

The infinity point position Yi is also referred to as an "infinity point correlation value" for convenience' sake. A processing for obtaining the infinity point position Yi is also referred to as an "infinity point obtainment processing" for convenience' sake.

Figure 4:
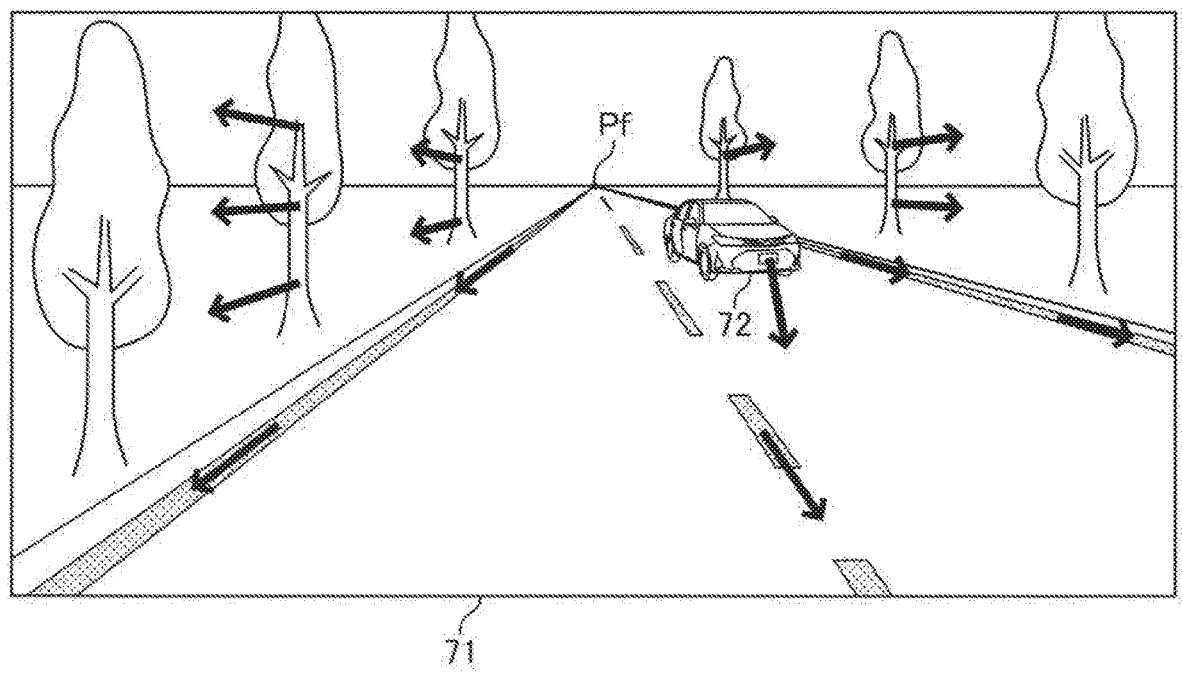
FIG. 4 is an example of a front image photographed by a camera apparatus included in the present vehicle.

A method of obtaining the infinity point will be described. An image 71 shown in FIG. 4 is an example of the front image obtained when the vehicle 10 is travelling straight ahead. A point Pf in FIG. 4 indicates the infinity point. Each of arrows in the image 71 indicates the flow vector. An (image of) an other vehicle 72 is contained in the image 71. The other vehicle 72 is travelling in a lane (oncoming lane) opposite to a lane (own lane) in which the vehicle 10 is travelling.

In the image 71, objects contained in the image 71 other than the other vehicle 72 is stationary. As understood from FIG. 4, straight lines passing through the start point and the end point of the flow vectors whose start points are not included in the other vehicle 72 (namely, the flow vectors whose start points are included in the stationary objects) pass through the point Pf. Generally, many of the objects in the front image are stationary, and thus, many of the straight lines (vector extended lines) each of which passes through the start point and endpoint of the obtained flow vector pass through the point Pf.

In view of this, the image processing section 52 obtains, as the infinity point, a point through which the largest number of the vector extended lines pass among points through which the vector extended lines pass (namely, points at which the vector extended lines intersect with each other).

The image processing section 52 outputs the obtained infinity point position Yi to the ECU 20 every time the time interval Δt elapses.

Notably, in addition to the ECU 20, the vehicle 10 is equipped with an ECU (driving support ECU) for detecting (extracting) various objects (for example, another vehicle different from the vehicle 10, a pedestrian and a position of the own lane) contained in the front image and for providing a "driving support function" which supports the driver of the vehicle 10 on the basis of the detected objects. However, a description related to the driving support function and operation of the driving support ECU is omitted in the present specification.

The vehicle height sensor 61 is provided in a suspension apparatus for the rear wheel on a passenger side of the vehicle 10 (see FIG. 1). Specifically, since the vehicle 10 is a right-hand drive vehicle, the vehicle height sensor 61 is provided in the suspension apparatus for the left rear wheel. The vehicle height sensor 61 detects a relative displacement amount of the spring upper member of the vehicle 10 with respect to a rotation axis of the left rear wheel (namely, a displacement amount of a distance between a mounting portion of the suspension apparatus of the left rear wheel in the vehicle body of the vehicle 10 and the rotation axis of the left rear wheel, with respect to a predetermined reference length) as a contraction length Ca, and outputs a signal indicative of the contraction length Ca to the ECU 20. The contraction length Ca increases as a weight of a load of the vehicle 10 including the driver, an occupant (passenger), and luggage (namely, the vehicle load) increases, on the premise that a position of the center of gravity of the vehicle load does not change (move).

The dimmer switch 62 is used/operated by the driver so as to select (change) a lighting state of the headlight 30. The driver can switch an operation states of the dimmer switch 62 among "OFF Position," "Low Beam Position" and "High Beam Position."

When the operation state of the dimmer switch 62 is the "Low Beam Position," the ECU 20 lights (turns on) the low beam unit 31 (namely, the left low beam unit 31a and the right low beam unit 31b). When the operation state of the dimmer switch 62 is the "High Beam Position," the ECU 20 lights the low beam unit 31 and the high beam unit 32.

(Auto-Leveling Processing)

The ECU 20 executes the auto-leveling processing for making (letting) the angle formed by "the irradiation direction of the low beam unit 31 represented by the dashed line Lba" and "the ground-based horizontal line" coincide with the antiglare angle θh even when the pitch angle θp changes. Namely, the ECU 20 obtains the pitch angle θp, and controls the irradiation angle θb on the basis of the obtained pitch angle θp such that a relationship of a following expression (1) is satisfied. Specifically, the ECU 20 obtains (figures out) a target irradiation angle θbtgt by substituting the obtained pitch angle θp into a following expression (1a), and controls the actuator 46 such that an actual value of the irradiation angle θb is equal to the target irradiation angle θbtgt.

$$\theta b = \theta h + \theta p \quad (1)$$

$$\theta btgt = \theta h + \theta p \quad (1a)$$

A method of obtaining the pitch angle θp will be described. When the standard infinity point position Ystd and the standard pitch angle θstd described later have not been obtained yet, the ECU 20 obtains an estimated (or extrapolated) pitch angle θe by applying the obtained (or detected) contraction length Ca to a relationship between the contraction length Ca and the estimated pitch angle θe, represented by a straight line Le shown in FIG. 5. The relationship between the contraction length Ca and the estimated pitch angle θe represented by the straight line Le is stored in the ROM 26 in a form of a map (lookup table).

In this case, the ECU 20 figures out the target irradiation angle θbtgt by substituting the estimated pitch angle θe into the expression (1a) as the pitch angle θp. In addition, the ECU 20 controls the actuator 46 such that the actual value of the irradiation angle θb coincides with the target irradiation angle θbtgt. Notably, the ECU 20 calculates a driving amount of the actuator 46 for making (letting) the irradiation angle θb coincide with the target irradiation angle θbtgt by means of applying the target irradiation angle θbtgt to a relationship between the driving amount of the actuator 46 and the irradiation angle θb, the relationship being stored in the ROM 26 in advance, and controls the actuator 46 on the basis of the calculated driving amount.

Figure 5:
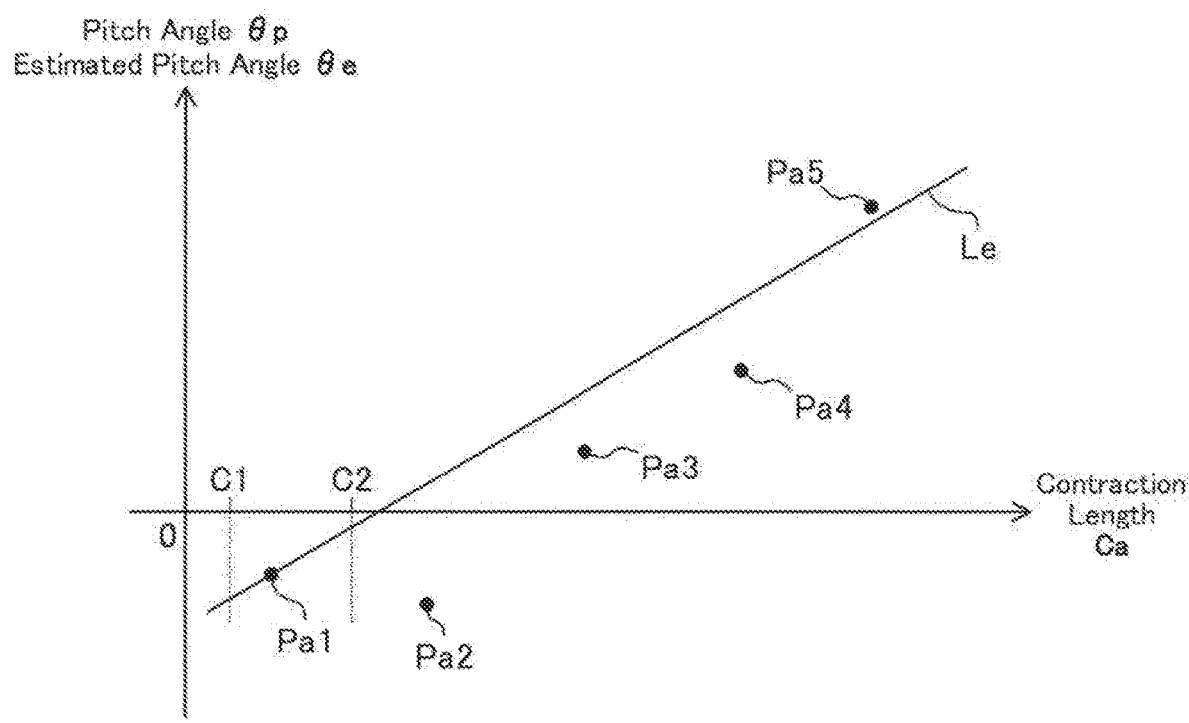
FIG. 5 is a graph showing a relationship between a detected value (contraction length) of a vehicle height sensor included in the present vehicle and a pitch angle of the present vehicle.

The straight line Le of FIG. 5 is a straight line determined such that the straight line Le passes through a point Pa1 and a sum of distances between the straight line Le and each of points Pa2 to Pa5 calculated by a least-squares method is minimized. The point Pa1 indicates the relationship between the contraction length Ca and the pitch angle θp in a case where an occupant (more specifically, an occupant with a predetermined standard weight) is seated only in (on) a driver seat of the vehicle 10 (namely, only the driver is in the vehicle 10). The point Pa2 indicates the relationship between the contraction length Ca and the pitch angle θp in a case where occupants are seated in the driver seat and a front passenger seat.

The point Pa3 indicates the relationship between the contraction length Ca and the pitch angle θp in a case where occupants are seated in all of seats of the vehicle 10. The point Pa4 indicates the relationship between the contraction length Ca and the pitch angle θp in a case where the occupants are seated in all the seats of the vehicle 10 and a burden with a predetermined standard weight is loaded in a rear trunk of the vehicle 10. The point Pa5 indicates the relationship between the contraction length Ca and the pitch angle θp in a case where the occupant is seated only in the driver seat and the burden with the standard weight is loaded in the rear trunk.

As understood from the points Pa1 to Pa5, there is no monotonically increasing relationship between the contraction length Ca and the pitch angle θp. In other words, even if the contraction length Ca is same, the pitch angle θp may differs depending on the position of the center of gravity of the vehicle load. Therefore, there may be a case where a magnitude of a difference between "the estimated/extrapolated pitch angle θe which is obtained by applying the contraction length Ca to the relationship between the contraction length Ca and the estimated pitch angle θe represented by the straight line Le" and "an actual value of the pitch angle θp" is relatively large, depending on the position of the center of gravity of the vehicle load.

In view of the forgoing, the ECU 20 obtains the pitch angle θp on the basis of the infinity point position Yi by utilizing a relationship of a monotonic decrease between the pitch angle θp and the infinity point position Yi. Specifically describing about the relationship between the pitch angle θp and the infinity point position Yi, the infinity point position Yi decreases (the infinity point in the front image moves downward) as the pitch angle θp increases (namely, the vehicle 10 leans backward). Meanwhile, the infinity point position Yi increases (the infinity point in the front image moves upward) as the pitch angle θp decreases (namely, the vehicle 10 leans forward).

An image base point Yo is defined as the infinity point position Yi obtained when the pitch angle θp is "0." The image base point Yo is indicated as a point on a line segment Lp which represents a projection plane of the front image in FIG. 1. In other words, when the pitch angle θp is "0," the image base point Yo is an intersection point (base intersection point) between the horizontal line Lh2 which is the vehicular horizontal line passing through the camera apparatus 50 (specifically, the imaging section 51) and the line segment Lp. Namely, when a length of the line segment Lp is treated (regarded) as the vertical pixel number Yd, a length from the lower end of the line segment Lp to the base intersection point corresponds to the image base point Yo.

The pitch angle θp whose value is equal to "0," is also referred to as a "specific angle" for convenience' sake. The image base point Yo is also referred to as a "specific infinity point position" for convenience' sake.

When a magnitude |θp| of the pitch angle θp is relatively small, a relationship between the pitch angle θp and the infinity point position Yi is approximately equal to a relationship represented by a following expression (2).

$$\theta p = \theta a \times (Yo - Yi)/Yd \qquad (2)$$

It is possible to obtain the image base point Yo in advance. For example, when the vehicle 10 is manufactured or the camera apparatus 50 is exchanged (replaced), the image base point Yo can be obtained on the basis of the front image containing an image of a "target object" which is placed at a predetermined position in front of the vehicle 10, the front image being obtained (photographed) in a case where the pitch angle θp is set/adjusted to be equal to "0." However, in many cases, it is not easy to accurately perform an operation (work) of placing the vehicle 10 at a predetermined position in a predetermined direction and of placing the target object at the predetermined position with respect to the vehicle 10, so that it is not easy to accurately obtain the image base point Yo according to this method.

On the other hand, in many cases, many of the objects in the front image are stationary as described above, and thus, it is possible to accurately obtain the infinity point position Yi on the basis of the front image obtained in a case where the vehicle 10 is travelling. In view of this, the ECU 20 obtains the pitch angle θp on the basis of the infinity point position Yi without reference to the image base point Yo.

More specifically, the ECU 20 obtains the pitch angle θp, based on a standard pitch angle θstd and a standard infinity point position Ystd. The standard pitch angle θstd is the pitch angle θp at a certain point in time. The standard infinity point position Ystd is the infinity point position Yi at that certain point in time when the pitch angle θp is equal to the standard pitch angle θstd. The standard infinity point position Ystd is also referred to as a "standard infinity point correlation value" for convenience' sake. A following expression (3) is obtained by substituting the standard pitch angle θstd and the standard infinity point position Ystd into the expression (2).

$$\theta std = \theta a \times (Yo - Ystd)/Yd \qquad (3)$$

The vehicle 10 in a case where the pitch angle θp is equal to the standard pitch angle θstd is shown in FIG. 6A. In FIG. 6A, an angle formed by a horizontal line Lh3 which is the ground-based horizontal line and a straight line Lf1 which is the vehicular horizontal line is equal to the standard pitch angle θstd (namely, the pitch angle θp in this case). In this example, the vehicle 10 is leaning forward, and thus, the pitch angle θp is a negative value.

Meanwhile, a following expression (4) is obtained by subtracting the expression (3) from the expression (2) (namely, by eliminating the image base point Yo from these expressions).

$$\theta p - \theta std = \theta a \times (Ystd - Yi)/Yd \qquad (4)$$

The vehicle 10 in a case where the pitch angle θp is different from the standard pitch angle θstd is shown in FIG. 6B. In FIG. 6B, an angle formed by a horizontal line Lh4 which is the ground-based horizontal line and a straight line Lf2 which is the vehicular horizontal line is the pitch angle θp in this example. A straight line Lst1 in FIG. 6B is a straight line and an angle formed by the straight line Lst1 and the straight line Lf2 is the standard pitch angle θstd. In this example, the vehicle 10 is leaning backward, and thus, the pitch angle θp is a positive value.

As understood from FIG. 6B, the expression (4) represents a relationship between (θp−θstd) which is an angle formed by the horizontal line Lh4 and the straight line Lst1 and (Ystd−Yi) which is a difference between the standard infinity point position Ystd and the infinity point position Yi. The left member of the expression (4) (namely, θp−θstd) is also referred to as a "third difference value" for convenience' sake. The difference between the standard infinity point position Ystd and the infinity point position Yi (namely, Ystd−Yi) included in the right member of the expression (4) is also referred to as a "fourth difference value" for convenience' sake.

A following expression (5) is obtained on the basis of the expression (4). According to the expression (5), it is possible to obtain the pitch angle θp on the basis of the infinity point position Yi, even if the image base point Yo cannot be obtained accurately.

$$\theta p = \theta a \times (Ystd - Yi)/Yd + \theta std \qquad (5)$$

Next, a method of obtaining the standard pitch angle θstd and the standard infinity point position Ystd will be described. When the vehicle load is the driver only (namely, the occupant is present only in the driver seat of the vehicle 10 and no load (luggage) is loaded on the vehicle 10), the contraction length Ca hardly changes, regardless of a weight of the driver. In other words, even if the weight of the driver changes as a result of changing (replacing) the drivers, an amount of change in the contraction length Ca is small and the position of the center of gravity of the vehicle load substantially remains unchanged.

In view of this, the ECU 20 obtains, as a pair of the standard pitch angle θstd and the standard infinity point position Ystd, a pair of the estimated pitch angle θe and the infinity point position Yi when the vehicle load is the driver only.

Specifically, the ECU 20 stores, as the standard pitch angle θstd in the non-volatile memory 28, the estimated pitch angle θe obtained by applying the contraction length Ca in a case where the vehicle load is the driver only to the relationship between the contraction length Ca and the estimated pitch angle θe represented by the straight line Le in FIG. 5. In addition, the ECU 20 stores the infinity point position Yi in this case as the standard infinity point position Ystd in the non-volatile memory 28.

Notably, when the vehicle 10 has just been manufactured, neither the standard pitch angle θstd nor the standard infinity point position Ystd is stored in the non-volatile memory 28. In addition, when the camera apparatus 50 is replaced or repaired, the standard pitch angle θstd and the standard infinity point position Ystd are deleted (erased) from the non-volatile memory 28.

The ECU 20 determines that the vehicle load is the driver only, when the contraction length Ca is larger than a predetermined first contraction length C1 and smaller than a predetermined second contraction length C2 (namely, C1<Ca<C2). The range from the first contraction length C1 to the second contraction length C2 is also referred to as a "standard range" for convenience' sake. A condition which is satisfied when the contraction length Ca falls within the standard range is also referred to as a "standard value obtainment condition" for convenience' sake.

(Specific Operation)

Next, specific operation of the ECU 20 related to the auto-leveling processing will be described. The CPU 25 (hereinafter also referred to as "the CPU" for simplification) of the ECU 20 executes an "auto-leveling processing routine" represented by a flowchart shown in FIG. 7 every time a predetermined time interval which is shorter than the time interval Δt elapses.

Figure 7:
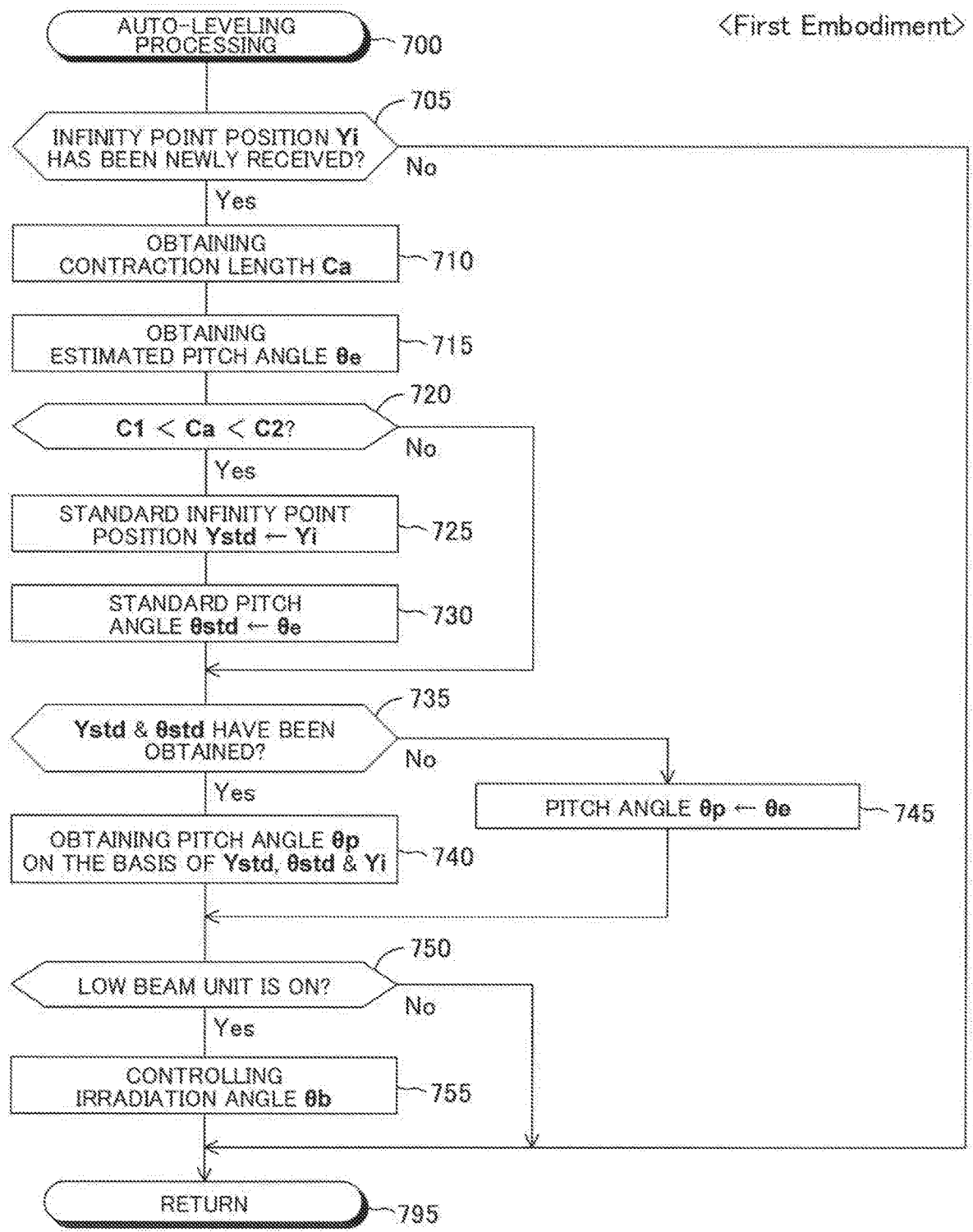
FIG. 7 is a flowchart representing an auto-leveling processing routine executed by the first control apparatus.

Therefore, when an appropriate timing has come, the CPU starts the process from step 700 of FIG. 7 and proceeds to step 705 so as to determine whether or not the infinity point position Yi has been newly received. Namely, the CPU determines whether or not the infinity point position Yi has been received from the camera apparatus 50 in a period from a time point when the present routine was executed last time to the present time point.

If the infinity point position Yi has not been newly received, the CPU makes a "No" determination in step 705 and proceeds to step 795 directly so as to end the present routine.

Meanwhile, if the infinity point position Yi has been newly received, the CPU makes a "Yes" determination in step 705 and proceeds to step 710 so as to obtain the contraction length Ca detected by the vehicle height sensor 61. Subsequently, the CPU proceeds to step 715 so as to obtain the estimated (or extrapolated) pitch angle θe by applying the contraction length Ca to the relationship between the contraction length Ca and the estimated pitch angle θe represented by the straight line Le in FIG. 5.

Furthermore, the CPU proceeds to step 720 so as to determine whether or not the contraction length Ca falls within the range between the first contraction length C1 and the second contraction length C2 (namely, the contraction length Ca is included in the standard range).

If the contraction length Ca falls within the range between the first contraction length C1 and the second contraction length C2, the CPU makes a "Yes" determination in step 720 and proceeds to step 725 so as to store the infinity point position Yi in the non-volatile memory 28 as the standard infinity point position Ystd. Subsequently, the CPU proceeds to step 730 so as to store the estimated pitch angle θe in the non-volatile memory 28 as the standard pitch angle θstd. Processing for obtaining the standard pitch angle θstd and the standard infinity point position Ystd (namely, the standard infinity point correlation value) is also referred to as a "standard value obtainment processing" for convenience' sake. Furthermore, the CPU proceeds to step 735.

Meanwhile, if the contraction length Ca does not fall within the range between the first contraction length C1 and the second contraction length C2, the CPU makes a "No" determination in step 720 and proceeds to step 735 directly.

In step 735, the CPU determines whether or not the standard infinity point position Ystd and the standard pitch angle θstd have been obtained. Namely, the CPU determines whether or not the standard infinity point position Ystd and the standard pitch angle θstd have been stored (or obtained and stored) in the non-volatile memory 28.

If the standard infinity point position Ystd and the standard pitch angle θstd have been obtained, the CPU makes a "Yes" determination in step 735 and proceeds to step 740 so as to obtain the pitch angle θp on the basis of the standard infinity point position Ystd, the standard pitch angle θstd and the infinity point position Yi. Specifically, the CPU obtains (figures out) the pitch angle θp by substituting the standard infinity point position Ystd, the standard pitch angle θstd and the infinity point position Yi into the expression (5) described above. Processing for obtaining the pitch angle θp on the basis of the standard infinity point position Ystd, the standard pitch angle θstd and the infinity point position Yi is also referred to as a "pitch angle estimation (or extrapolation) processing" for convenience' sake. Subsequently, the CPU proceeds to step 750.

Meanwhile, if the standard infinity point position Ystd and the standard pitch angle θstd have not been obtained, the CPU makes a "No" determination in step 735 and proceeds to step 745 so as to set the pitch angle θp to a value equal to the estimated pitch angle θe, Namely, the CPU obtains the value equal to the estimated pitch angle θe as the pitch angle θp. Subsequently, the CPU proceeds to step 750.

In step 750, the CPU determines whether or not the low beam unit 31 is On (namely, being turned on). Namely, the CPU determines whether or not the operation state of the dimmer switch 62 is either the "Low Beam Position" or the "High Beam Position."

If the low beam unit 31 is On, the CPU makes a "Yes" determination in step 750 and proceeds to step 755 so as to control the irradiation angle θb. More specifically, the CPU obtains (figures out) the target irradiation angle θbtgt by substituting the pitch angle θp into the expression (1a) described above. In addition, the CPU controls the actuator 46 such that the actual value of the irradiation angle θb coincides with the target irradiation angle θbtgt. Subsequently, the CPU proceeds to step 795.

Meanwhile, if the low beam unit 31 is not θn, the CPU makes a "No" determination in step 750 and proceeds to step 795 directly.

First Modification of First Embodiment

Next, the headlight control apparatus according to a first modification of the first embodiment of the present disclosure (hereinafter also referred to as the "first modification apparatus") will be described. The first control apparatus described above obtains the pitch angle θp on the basis of the standard infinity point position Ystd and the standard pitch angle θstd which have been obtained when the contraction length Ca fell within (was included in) the standard range. In contrast, the first modification apparatus obtains the pitch angle θp on the basis of the standard pitch angle θstd and a reference pitch angle θref which have been obtained when the contraction length Ca fell within the standard range. Hereinafter, this difference will be mainly described.

A headlight control ECU 21 (hereinafter also referred to as the "ECU 21" for simplification) according to the first modification apparatus obtains the standard pitch angle θstd and the reference pitch angle θref when the contraction length Ca fell within the standard range (namely, it is determined that the vehicle load is the driver only). In addition, the ECU 21 stores those of the standard pitch angle θstd and the reference pitch angle θref in the non-volatile memory 28. The reference pitch angle θref is also referred to as the "standard infinity point correlation value" for convenience' sake. When the contraction length Ca does not fall within the standard range, the ECU 21 obtains the pitch angle θp on the basis of the standard pitch angle θstd and the reference pitch angle θref.

This method of obtaining the pitch angle θp will be specifically described with reference to FIG. 8. When the contraction length Ca falls within the standard range, the ECU 21 figures out a current pitch angle θn by substituting the infinity point position Yi and the image base point Yo which has been obtained and stored in the non-volatile memory 28 in advance into a following expression (6). The current pitch angle θn is also referred to as the "infinity point correlation value" for convenience' sake. The expression (6) represents the same relationship as the expression (2) described above.

$$\theta n = \theta a \times (Yo - Yi)/Yd \quad (6)$$

In addition, the ECU 21 obtains a value equal to the current pitch angle θn as the reference pitch angle θref. By treating the infinity point position Yi in this case as the standard infinity point position Ystd, a relationship represented by a following expression (7) is satisfied.

$$\theta ref = \theta a \times (Yo - Ystd)/Yd \quad (7)$$

Furthermore, the ECU 21 obtains the estimated pitch angle θe by applying the contraction length Ca to the relationship between the contraction length Ca and the estimated pitch angle θe represented by the straight line Le. In addition, the ECU 21 obtains a value equal to the estimated pitch angle θe as the standard pitch angle θstd.

Figure 8:
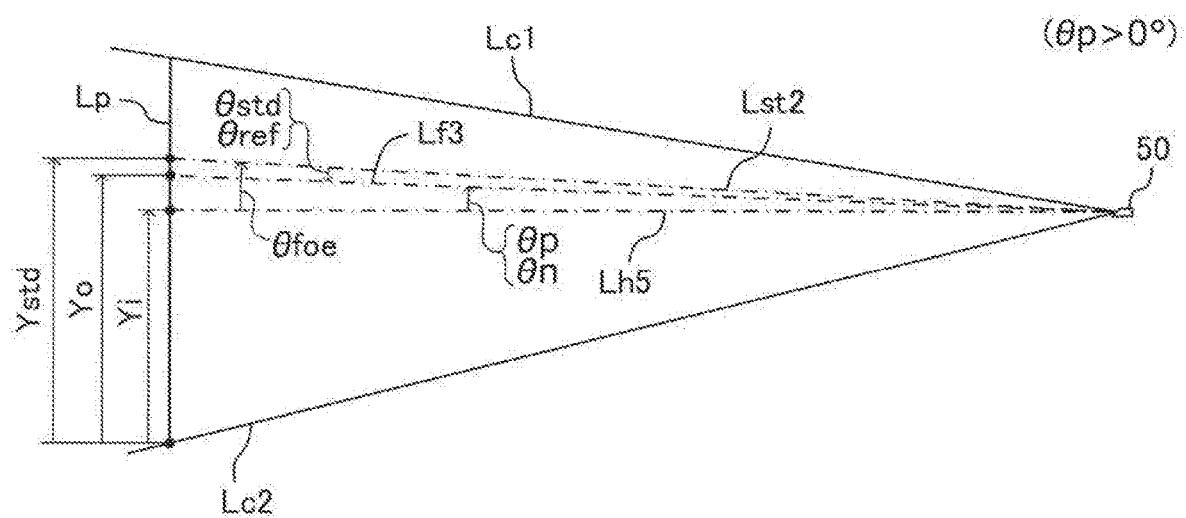
FIG. 8 is a diagram for explaining a process in which a first modification of the first embodiment of the present disclosure (first modification apparatus) obtains the pitch angle.

An example of a case where the standard pitch angle θstd and the reference pitch angle θref have been obtained and the contraction length Ca does not fall within the standard range is shown in FIG. 8. In FIG. 8, an angle formed by a horizontal line Lh5 which is the ground-based horizontal line and a straight line Lf3 which is the vehicular horizontal line is the pitch angle θp in the present example. A straight line Lst2 in FIG. 8 is a straight line and an angle formed by the straight line Lst2 and the straight line Lf3 is the standard pitch angle θstd. In the present example, the vehicle 10 is leaning backward, and thus, the pitch angle θp is a positive value.

When the contraction length Ca does not fall within the standard range, the ECU 21 figures out the current pitch angle θn on the basis of the expression (6) and figures out a displacement pitch angle θfoe by substituting that the current pitch angle θn into a following expression (8). In FIG. 8, the displacement pitch angle θfoe is an angle formed by the horizontal line Lh5 and the straight line Lf3. In other words, the displacement pitch angle θfoe is a difference between "the pitch angle θp at a point in time when the standard pitch angle θstd and the reference pitch angle θref were obtained" and "the pitch angle θp at the present time."

$$\theta foe = \theta n - \theta ref \quad (8)$$

In addition, the ECU 21 obtains (figures out) the pitch angle θp on the basis of a following expression (9).

$$\theta p = \theta foe + \theta std \quad (9)$$

A reason for obtaining the pitch angle θp on the basis of the displacement pitch angle θfoe will now be described. A following expression (10) is obtained on the basis of the expression (6) to (9).

$$\theta p = \quad (10)$$
$$(\theta n - \theta ref) + \theta std = \{\theta a \times (Yo - Yi)/Yd \to \theta a \times (Yo - Yref)/Yd\} + \theta std$$

In many cases, a magnitude of a difference between the standard pitch angle θstd obtained in a case where it was determined that the vehicle load was the driver only and the actual value of the pitch angle θp at that point in time is small. Meanwhile, there is a high possibility that a magnitude of a difference between "the reference pitch angle θref obtained at the point in time when the standard pitch angle θstd was obtained" and "the actual value of the pitch angle θp at that point in time" is relatively large, since that reference pitch angle θref is figured out on the basis of the image base point Yo.

Furthermore, there is a high possibility that a magnitude of a difference between the current pitch angle θn obtained at the present time and the actual value of the pitch angle θp at the present time is relatively large, since that current pitch angle θn, similarly to the reference pitch angle θref, is figured out on the basis of the image base point Yo. However, the displacement pitch angle θfoe is set to a value equal to a difference between the current pitch angle θn at the present time and the reference pitch angle θref, so that an error caused by an accuracy in obtainment of the image base point Yo is canceled out.

In other words, the displacement pitch angle θfoe indicates a difference between the pitch angle θp at the present time and the standard pitch angle θstd accurately. Therefore, according to the first modification apparatus, even if the image base point Yo has not been obtained accurately, it is possible to accurately obtain the pitch angle θp at the present time on the basis of the expression (9).

(Specific Operation)

Next, specific operation of the ECU 21 related to the auto-leveling processing will be described. The CPU 25 (hereinafter also referred to as "the CPU" for simplification) of the ECU 21 executes the "auto-leveling processing routine" represented by a flowchart shown in FIG. 9 every time a predetermined time interval which is shorter than the time interval Δt elapses.

Figure 9:
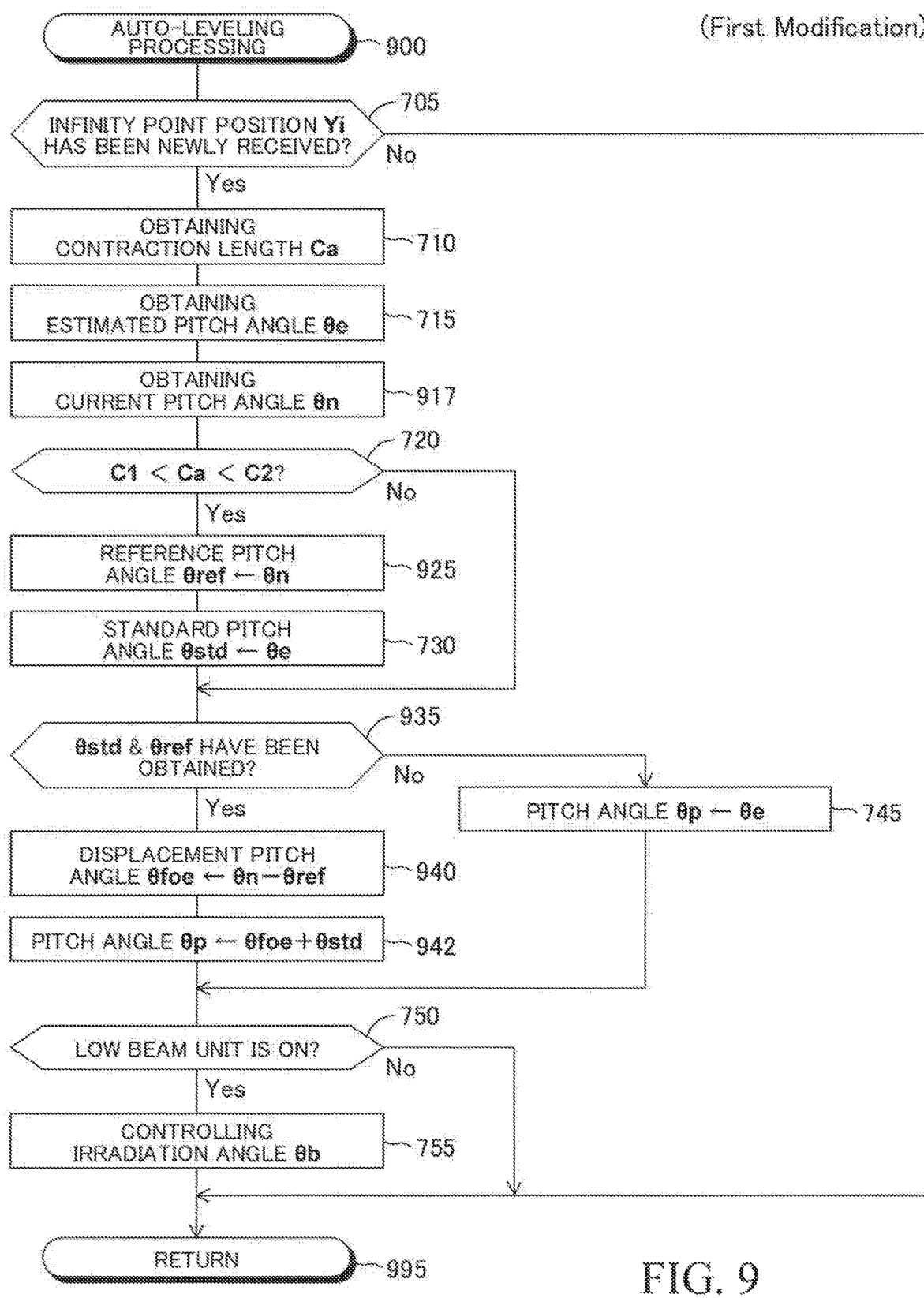
FIG. 9 is a flowchart representing the auto-leveling processing routine executed by the first modification apparatus.

Notably, each step shown in FIG. 9 at which the same processing is performed as each step shown in FIG. 7 is given the same step symbol as one given to such step shown in FIG. 7.

When an appropriate timing has come, the CPU starts the process from step 900 of FIG. 9 and proceeds to step 705. After executing the process in step 715, the CPU proceeds to step 917 so as to obtain (figure out) the current pitch angle θn on the basis of the expression (6) described above (namely, on the basis of the image base point Yo and the infinity point position Yi). Subsequently, the CPU proceeds to step 720.

When the "Yes" determination is made in step 720 (namely, the contraction length Ca falls within the standard range), the CPU proceeds to step 925 so as to store the current pitch angle θn as the reference pitch angle θref in the non-volatile memory 28. Subsequently, the CPU proceeds to step 730 so as to store the estimated pitch angle θe as the standard pitch angle θstd in the non-volatile memory 28. Processing for obtaining the standard pitch angle θstd and the reference pitch angle θref (namely, the standard infinity point correlation value) is also referred to as the "standard value obtainment processing" for convenience' sake. Furthermore, the CPU proceeds to step 935.

Meanwhile, when the "no" determination is made in step 720, the CPU proceeds to step 935 directly.

In step 935, the CPU determines whether or not the standard pitch angle θstd and the reference pitch angle θref have been obtained. Namely, the CPU determines whether or not the standard pitch angle θstd and the reference pitch angle θref have been stored in the non-volatile memory 28.

If the standard pitch angle θstd and the reference pitch angle θref have been obtained, the CPU makes a "Yes" determination in step 935 and proceeds to step 940 so as to obtain the displacement pitch angle θfoe on the basis of the expression (8) described above. Subsequently, the CPU proceeds to step 942 so as to obtain the pitch angle θp on the basis of the expression (9) described above. Processing for obtaining the pitch angle θp on the basis of the reference pitch angle θref, the standard pitch angle θstd and the current pitch angle θn is also referred to as the "pitch angle estimation processing" for convenience' sake. Furthermore, the CPU proceeds to step 750.

Meanwhile, if the standard pitch angle θstd and the reference pitch angle θref have not been obtained, the CPU makes a "No" determination in step 935 and proceeds to step 745.

Second Modification of First Embodiment

Next, the headlight control apparatus according to a second modification of the first embodiment of the present disclosure (hereinafter also referred to as the "second modification apparatus") will be described. The first control apparatus described above obtains the pitch angle θp on the basis of the expression (5) described above. In contrast, the second modification apparatus is different from the first control apparatus only in that the pitch angle θp is obtained on the basis of an expression (14) described later. Hereinafter, this difference will be mainly described.

As understood from a rectangular triangle defined by the horizontal line Lh4, the straight line Lf2 and the line segment Lp shown in FIG. 6B (in which the horizontal line Lh4 and the line segment Lp are perpendicular to each other), a relationship among the pitch angle θp, the image base point Yo and the infinity point position Yi is represented by a following expression (11). In the expression (11), K is a positive constant.

$$\tan(\theta p) = K \times (Yo - Yi) \quad (11)$$

A following expression (12) is obtained by substituting the standard pitch angle θstd and the standard infinity point position Ystd into the expression (11).

$$\tan(\theta std) = K \times (Yo - Ystd) \quad (12)$$

Furthermore, a following expression (13) is obtained by subtracting the expression (12) from the expression (11) (namely, by eliminating the image base point Yo from these expressions). Accordingly, it is possible to obtain the pitch angle θp on the basis of a following expression (14). More specifically, a headlight control ECU 22 according to the second modification apparatus obtains (figures out) the pitch angle θp by substituting the standard infinity point position Ystd, the standard pitch angle θstd and the infinity point position Yi into the expression (14), when the process in step 740 of FIG. 7 is executed. The left member of the expression (13) (namely, tan(θp)−tan(θstd)) is also referred to as a "first difference value" for convenience' sake. The difference between the standard infinity point position Ystd and the infinity point position Yi (namely, Ystd−Yi) included in the right member of the expression (13) is also referred to as a "second difference value" for convenience' sake.

$$\tan(\theta p) - \tan(\theta std) = K \times (Ystd - Yi) \quad (13)$$

$$\tan(\theta p) = K \times (Ystd - Yi) + \tan(\theta std) \quad (14)$$

Second Embodiment

Next, a second embodiment of the present disclosure will be described. The first control apparatus described above obtains the standard infinity point position Ystd and the standard pitch angle θstd when the field angle θa falls within the standard range. Meanwhile, the headlight control apparatus according to the second embodiment (hereinafter also referred to as the "second control apparatus") obtains the standard infinity point position Ystd and the standard pitch angle θstd when the contraction length Ca is smaller than a value obtained by subtracting a predetermined difference threshold α (positive constant) from a standard contraction length Cstd (namely, Ca<Cstd−α). Hereinafter, this difference will be mainly described.

The standard contraction length Cstd is set to a value equal to the contraction length Ca of when the standard infinity point position Ystd and the standard pitch angle θstd are obtained. In other words, the standard infinity point position Ystd and the standard pitch angle θstd are newly obtained (updated) every time the contraction length Ca becomes smaller than a value obtained by subtracting the difference threshold α from the standard contraction length Cstd. In addition, the contraction length Ca at that point in time is newly obtained as the standard contraction length Cstd (namely, the standard contraction length Cstd is updated). A condition which is satisfied when the contraction length Ca is smaller than a value obtained by subtracting the difference threshold α from the standard contraction length Cstd is also referred to as a "standard value obtainment condition" for convenience' sake.

The standard contraction length Cstd stored in the non-volatile memory 28 at the time of manufacturing the vehicle 10 is equal to a predetermined contraction length initial value Ci. The contraction length initial value Ci is larger than a value obtained by adding the difference threshold α to a maximum contraction length Cmax (namely, Cmax+α<Ci). The maximum contraction length Cmax is approximately equal to an upper limit of a range of the contraction length Ca detected by the vehicle height sensor 61. Notably, when the camera apparatus 50 is replaced or repaired, the standard contraction length Cstd is set to the contraction length initial value Ci.

The contraction length Ca which is obtained when the vehicle 10 is travelling for the first time after the vehicle 10 was manufactured is smaller than a value obtained by subtracting the difference threshold α from the contraction length initial value Ci, so that the standard value obtainment condition is satisfied. Accordingly, at this time, the contraction length Ca is obtained (stored) as the standard contraction length Cstd, and the standard infinity point position Ystd and the standard pitch angle θstd are obtained. Thereafter, when the contraction length Ca becomes smaller than a value obtained by subtracting the difference threshold α from the stored standard contraction length Cstd, the standard infinity point position Ystd and the standard pitch angle θstd are newly obtained.

The difference threshold α is, for example, a small value as compared with a change amount of the contraction length Ca in a case where the number of occupants in the vehicle 10 decreases, and determined in advance such that the standard value obtainment condition cannot be repeatedly satisfied while the vehicle 10 is travelling when/while the vehicle load has not changed (Specific Operation)

Next, specific operation of a headlight control ECU 23 (hereinafter also referred to as the "ECU 23" for simplification) according to the second embodiment will be described. The CPU 25 (hereinafter also referred to as "the CPU" for simplification) of the ECU 23 executes the "auto-leveling processing routine" represented by a flowchart shown in FIG. 10 every time a predetermined time interval which is shorter than the time interval Δt elapses.

Figure 10:
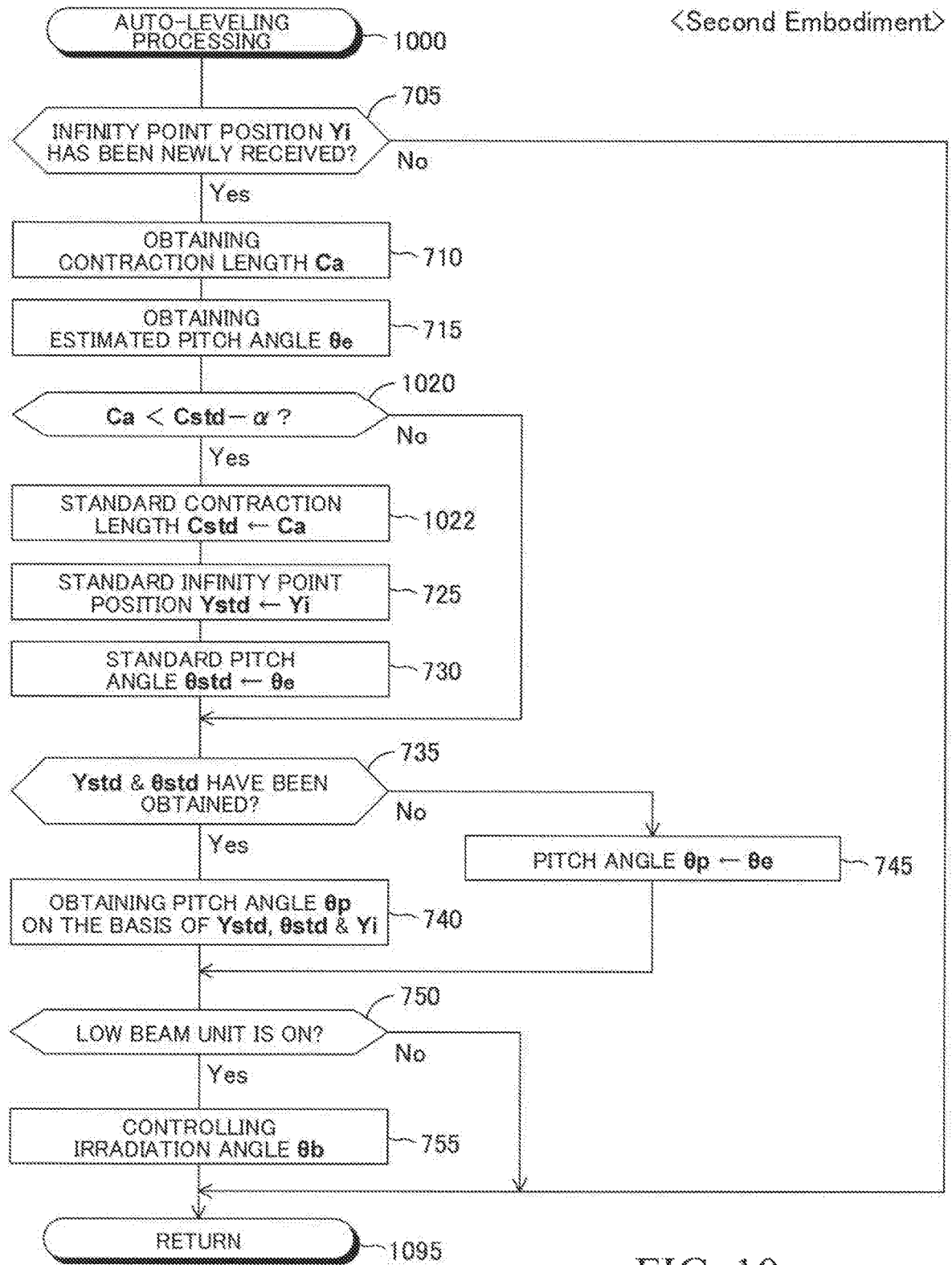
FIG. 10 is a flowchart representing the auto-leveling processing routine executed by the headlight control apparatus according to a second embodiment of the present disclosure.

Notably, each step shown in FIG. 10 at which the same processing is performed as each step shown in FIG. 7 is given the same step symbol as one given to such step shown in FIG. 7.

When an appropriate timing has come, the CPU starts the process from step 1000 of FIG. 10 and proceeds to step 705. After executing the process in step 715, the CPU proceeds to step 1020 so as to determine whether or not the contraction length Ca is smaller than a value obtained by subtracting the difference threshold α from the standard contraction length Cstd.

When the contraction length Ca is smaller than a value obtained by subtracting the difference threshold α from the standard contraction length Cstd, the CPU makes a "Yes" determination in step 1020 and proceeds to step 1022 so as to store the contraction length Ca as the standard contraction length Cstd in the non-volatile memory 28. Subsequently, the CPU proceeds to step 725.

Meanwhile, the contraction length Ca is equal to or larger than a value obtained by subtracting the difference threshold α from the standard contraction length Cstd, the CPU makes a "No" determination in step 1020 and proceeds to step 735 directly.

After executing the processing of step 755, the CPU proceeds to step 1095 directly so as to end the present routine. In addition, if the determination condition of step 705 is not satisfied (namely, the infinity point position Yi has not been newly received), the CPU makes a "No" determination in step 705 and proceeds to step 1095 directly.

Modification of Second Embodiment

Next, the headlight control apparatus according to a modification of the second embodiment of the present disclosure (hereinafter also referred to as the "third modification apparatus") will be described. The second control apparatus described above obtains the pitch angle θp on the basis of the standard infinity point position Ystd and the standard pitch angle θstd which have been obtained when the standard value obtainment condition was satisfied. In contrast, similar to the first modification apparatus described above, the third modification apparatus obtains the pitch angle θp on the basis of the standard pitch angle θstd and the reference pitch angle θref which have been obtained when the standard value obtainment condition was satisfied.

The CPU 25 (hereinafter also referred to as "the CPU" for simplification) of a headlight control ECU 24 (hereinafter also referred to as the "ECU 24" for simplification) according to the third modification apparatus executes the "auto-leveling processing routine" represented by a flowchart shown in FIG. 11 every time a predetermined time interval which is shorter than the time interval Δt elapses.

Figure 11:
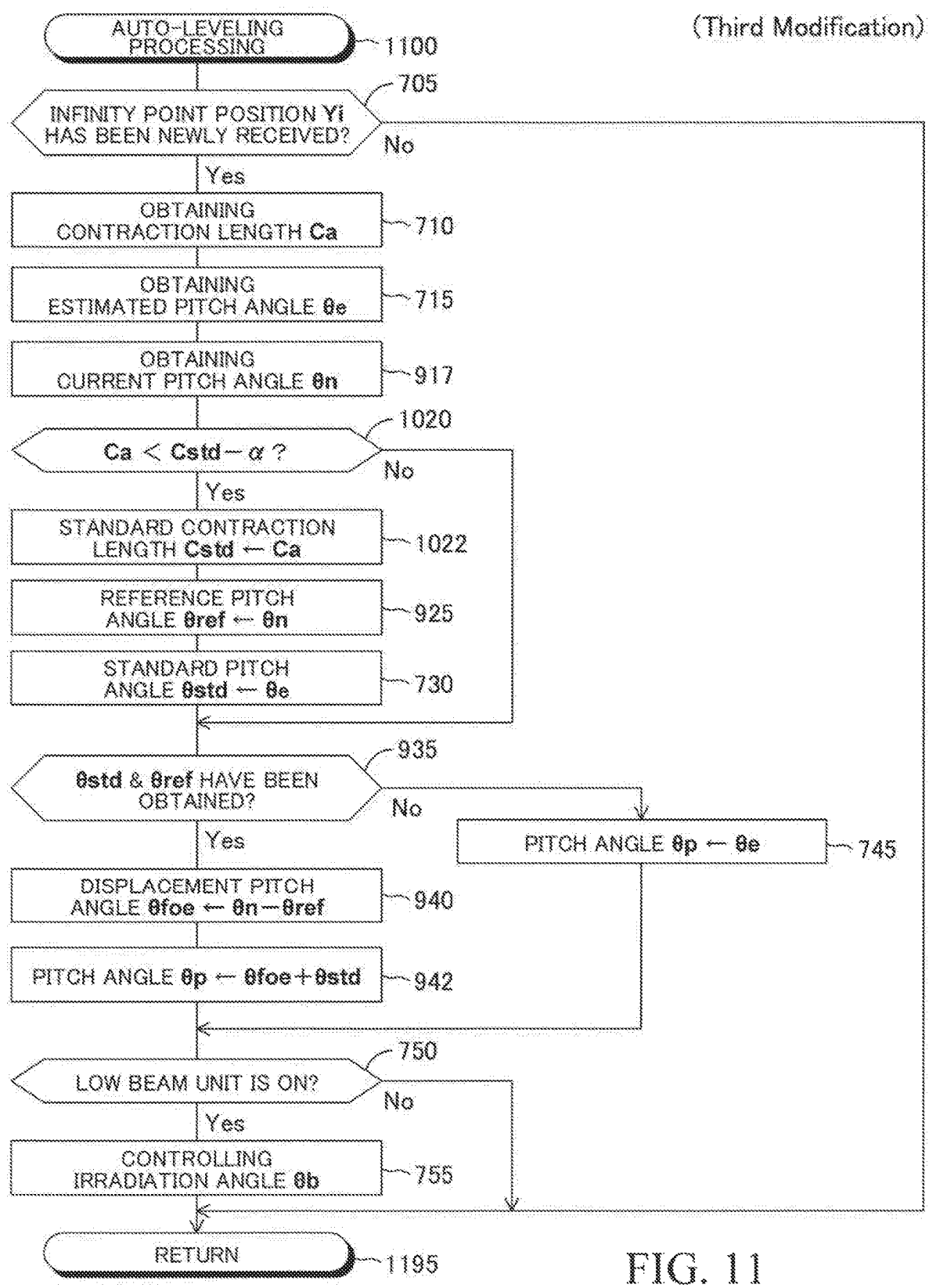
FIG. 11 is a flowchart representing the auto-leveling processing routine executed by the headlight control apparatus according to a modification of the second embodiment.

Notably, each step shown in FIG. 11 at which the same processing is performed as each step shown in FIG. 7 is given the same step symbol as one given to such step shown in FIG. 7. Similarly, each step shown in FIG. 11 at which the same processing is performed as each step shown in FIG. 9 or 10 is given the same step symbol as one given to such step shown in FIG. 9 or 10.

When an appropriate timing has come, the CPU starts the process from step 1100 of FIG. 11 and proceeds to step 705.

After executing the processing in step 917, the CPU proceeds to step 1020. After executing the processing in step 1022, the CPU proceeds to step 925.

After executing the processing in step 755, the CPU proceeds to step 1195 so as to end the present routine. In addition, when the determination condition of step 705 is not satisfied (namely, the infinity point position Yi has not been newly received), the CPU makes a "No" determination in step 705 and proceeds to step 1195 directly.

As having been described above, the first control apparatus and the second control apparatus can obtain the pitch angle θp on the basis of the contraction length Ca detected by the vehicle height sensor 61 and the infinity point position Yi obtained by the camera apparatus 50. In other words, according to the first control apparatus and the second control apparatus, even if the vehicle height sensor 61 is provided in the suspension apparatus only for the rear wheel, the pitch angle θp can be obtained by means of using the camera apparatus 50 equipped for providing the driving support function.

Especially, according to the first control apparatus (and, the first modification apparatus and the second modification apparatus), it is possible to accurately obtain the pitch angle θp on the basis of the standard pitch angle and the standard infinity point correlation value obtained when the contraction length Ca falls within the standard range. According to the second control apparatus (and the third modification apparatus), the standard pitch angle and the standard infinity point correlation value are obtained early after the vehicle 10 was manufactured, and thus, it is possible to expand opportunities for obtaining the pitch angle θp on the basis of the standard pitch angle and the standard infinity point correlation value.

The embodiments of the headlight control apparatus according to the present disclosure have been described; however, the present disclosure is not limited to the above-described embodiments, and various modifications are possible without departing from the scope of the disclosure. For example, according to the present embodiments, the image processing section 52 obtains the infinity point position Yi. However, the infinity point position Yi may be obtained by the ECU 20. In this case, the image processing section 52 may be configured to output/transmits data (namely, static image data) representing the front image to the ECU 20 every time the time interval Δt elapses.

In addition, the image processing section 52 according to the present embodiments outputs/transmits the infinity point position Yi every time the time interval Δt elapses. However, the image processing section 52 may be configured not to output/transmit the infinity point position Yi to the ECU 20 when the infinity point position Yi cannot be obtained accurately (for example, in a case where the vehicle 10 is not travelling (moving)).

In addition, the ECU 20 according to the first control apparatus obtains the pitch angle θp on the basis of the standard infinity point position Ystd, the standard pitch angle θstd and the infinity point position Yi if the standard infinity point position Ystd and the standard pitch angle θstd have been obtained (namely, in a case where the "Yes" determination is made in step 735), regardless of whether or not the contraction length Ca falls within the standard range. Namely, in this case, the ECU 20 executes the process in 740. However, when the contraction length Ca falls within the standard range, the ECU 20 may obtain the pitch angle θp by executing a process different from that in step 740. For example, in this case, the ECU 20 may obtain a value equal to the estimated pitch angle θe obtained by executing the process in step 715 as the pitch angle θp.

In addition, the ECU 20 according to the first control apparatus determines that the vehicle load is the driver only when the contraction length Ca is larger than the first contraction length C1 and smaller than the second contraction length C2. In other words, the first contraction length C1 has been set to a value approximately equal to a lower limit of a range of the contraction length Ca in a case where the vehicle load is the driver only. However, the first contraction length C1 may be set to a value approximately equal to the contraction length Ca in a case where there is no vehicle load in the vehicle 10.

In addition, the ECU 23 according to the second control apparatus obtains the pitch angle θp by substituting the standard infinity point position Ystd, the standard pitch angle θstd and the infinity point position Yi into the expression (5) described above (see step 740 in FIG. 10). However, the ECU 23 may be configured to obtain the pitch angle θp by substituting the standard infinity point position Ystd, the standard pitch angle θstd and the infinity point position Yi into the expression (14).

In addition, the specific angle according to the present embodiments is "0." However, the specific angle may be a value different from "0." In this case, the image base point Yo is a value equal to the infinity point position Yi obtained when the pitch angle θp is equal to that specific angle different from "0."

In addition, the difference threshold α according to the second embodiments is a positive constant. However, the difference threshold α may be set to "0."

In addition, the ECU 20 according to the first embodiment obtains the standard pitch angle θstd by applying the contraction length Ca to the relationship between the contraction length Ca and the estimated pitch angle θe represented by the straight line Le when the contraction length Ca falls within the standard range. However, the ECU 20 may obtain the standard pitch angle θstd by applying the contraction length Ca to a relationship (specific relationship; nonlinear relationship obtained and stored in advance) between the contraction length Ca and the estimated pitch angle θe different from the relationship represented by the straight line Le when the contraction length Ca falls within the standard range.

In this case, the ECU 20 stores the specific relationship in the non-volatile memory 28 and obtains the standard pitch angle θstd by applying the contraction length Ca to the specific relationship when the contraction length Ca falls within the standard range. For example, the specific relationship may be obtained on the basis of a plurality of combinations of the contraction length Ca and the pitch angle θp obtained (measured) in various cases where the vehicle load is a driver only and each of drivers with different weights from each other is seated one by one.

In addition, in the present embodiments, the irradiation angle θb is changed (controlled) by the operation of the actuator 46. However, the irradiation angle θb may be changed by a method different from this. For example, the low beam unit 31 may be configured such that a region irradiated by the bulb 41 is changed as a position of a shielding plate disposed in front of the bulb 41 is changed. In this case, the irradiation angle θb is changed as the position of the shielding plate is changed.

In addition, the vehicle height sensor 61 according to the present embodiments is provided in the suspension apparatus for the rear wheel on the passenger side of the vehicle 10. However, two of vehicle height sensors may be provided in the suspension apparatuses for both of the rear wheels respectively. In this case, the ECU 20 may be configured to obtain an average of the values detected by the two vehicle height sensors as the contraction length Ca. Alternatively, the vehicle height sensor 61 may be provided in the suspension apparatus for the front wheel of the vehicle 10.

In addition, the first control apparatus and the second control apparatus obtain the pitch angle θp regardless of whether or not the low beam unit 31 is θn. However, the ECU 20 may be configured to obtain the pitch angle θp only when the low beam unit 31 is θn.

In addition, the camera apparatus 50 according to the present embodiments obtains the image of the region in front of the vehicle 10. However, the camera apparatus 50 may be disposed on the vehicle 10 so as to obtain an image of a region behind the vehicle 10 in addition to the region in front of the vehicle 10.

What is claimed is:

1. A headlight control apparatus for a vehicle, wherein the vehicle includes a headlight, a vehicle body having a spring upper member, front wheels, and rear wheels, comprising:
    an actuator configured to adjust an irradiation angle of the headlight with respect to the vehicle body;
    a vehicle height sensor configured to detect, as a contraction length, a relative displacement amount of the spring upper member with respect to a rotation axis of the front wheels or the rear wheels of said vehicle;
    a camera configured to obtain a travelling direction image by photographing a region in a travelling direction of said vehicle; and
    a controller including at least one processor and a memory storing computer instructions, said computer instructions configured, when executed by said at least one processor, to cause the controller to:
        obtain an infinity point correlation value having a correlation with an infinity point position which is a position of an infinity point contained in said travelling direction image in a vertical direction of said travelling direction image;
        determine whether a predetermined standard value obtainment condition is satisfied based on the detected contraction length;
        based upon a determination that the predetermined standard value obtainment condition is satisfied, obtain a standard pitch angle by applying said detected contraction length to a predetermined relationship between said contraction length and a pitch angle of the vehicle and obtain said infinity point correlation value at a present time as a standard infinity point correlation value;
        based upon a determination that the predetermined standard value obtainment condition is not satisfied, obtain a current pitch angle of the vehicle based on said standard pitch angle, said standard infinity point correlation value, and said infinity point correlation value that is obtained at the present time;
        obtain a target irradiation angle based on said obtained current pitch angle; and
        control said actuator such that said irradiation angle coincides with said obtained target irradiation angle.

2. The headlight control apparatus according to claim 1, wherein
    said controller is configured to determine that said standard value obtainment condition is satisfied when said detected contraction length falls within a predetermined standard range.

3. The headlight control apparatus according to claim 2, wherein
said controller is configured to employ, as said standard range, a range from a minimum value to a maximum value of said contraction length obtained while a load of said vehicle is a driver only.

4. The headlight control apparatus according to claim 1, wherein
said controller is configured to:
determine that said standard value obtainment condition is satisfied when said detected contraction length is smaller than a value obtained by subtracting a difference threshold from a standard contraction length; and
update said standard contraction length such that said standard contraction length is set to a value equal to said detected contraction length of when it is determined that said standard value obtainment condition is satisfied.

5. The headlight control apparatus according to claim 4, wherein
said controller is configured to set said standard contraction length to a value larger than a value obtained by adding said difference threshold to an upper limit of a range of said detected contraction length in a case where said standard pitch angle has not been obtained yet.

6. The headlight control apparatus according to claim 1, wherein
said controller is configured to obtain said pitch angle on the basis of a relationship that a first difference value is proportional to a second difference value, said first difference value being a difference between the tangent of said pitch angle at the present time and the tangent of said standard pitch angle, and said second difference value being a difference between said standard infinity point correlation value and said infinity point correlation value at the present time.

7. The headlight control apparatus according to claim 1, wherein
said controller is configured to obtain said pitch angle on the basis of a relationship that a third difference value is proportional to a fourth difference value, said third difference value being a difference between said pitch angle at the present time and said standard pitch angle, and said fourth difference value being a difference between said standard infinity point correlation value and said infinity point correlation value at the present time.

8. The headlight control apparatus according to claim 1, wherein
said controller is configured to:
obtain, as said infinity point correlation value, a value proportional to a difference between a specific infinity point position and said infinity point position at the present time, said specific infinity point position being said infinity point position obtained when said pitch angle was equal to a predetermined specific angle; and
obtain, as said pitch angle, a value obtained by adding said standard pitch angle to a difference between said infinity point correlation value and said standard infinity point correlation value.

* * * * *